(No Model.)
C. ZIMMERMAN.
WAGON TIRE.
No. 493,143. Patented Mar. 7, 1893.
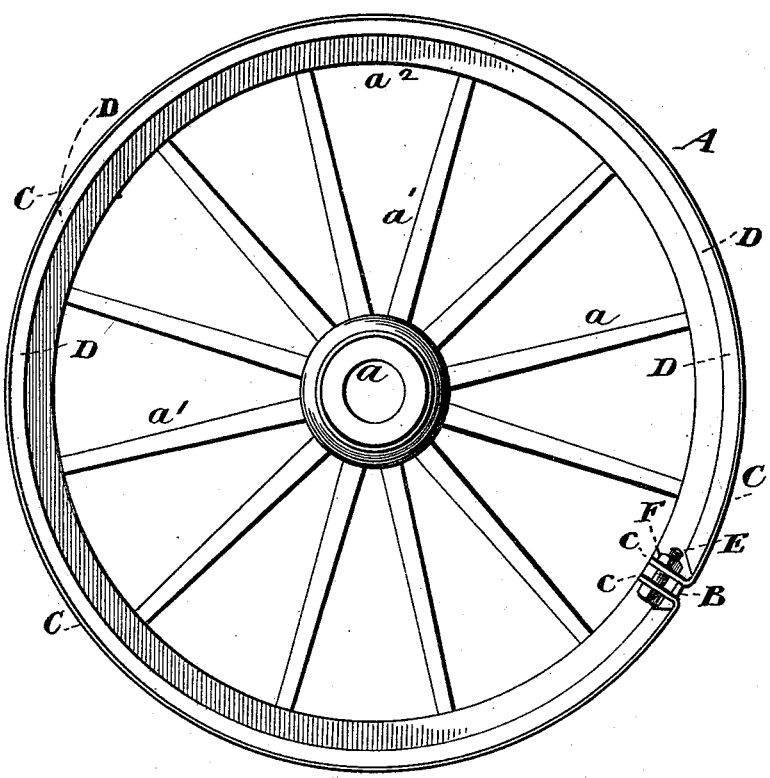
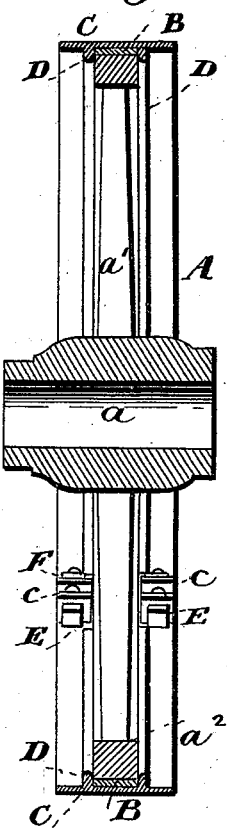
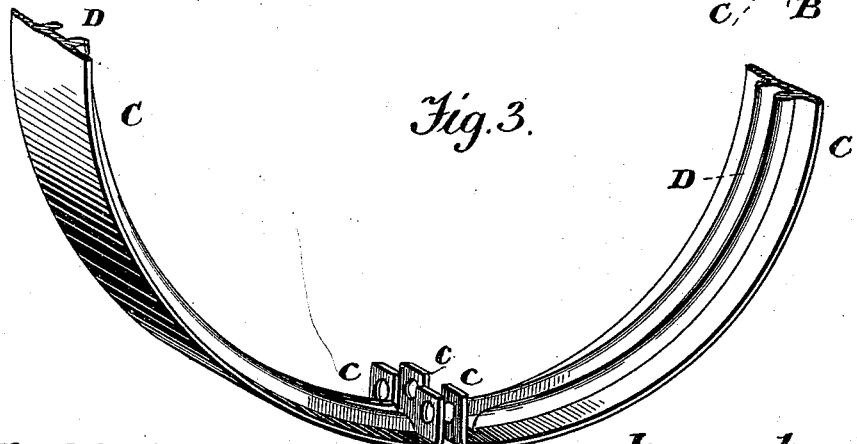
Witnesses.
A. Ruppert.
H. A. Daniels
Inventor:
Casper Zimmerman
Per
Thomas P. Simpson
Atty

UNITED STATES PATENT OFFICE.

CASPER ZIMMERMAN, OF SIOUX FALLS, SOUTH DAKOTA.

WAGON-TIRE.

SPECIFICATION forming part of Letters Patent No. 493,143, dated March 7, 1893.

Application filed October 3, 1892. Serial No. 447,643. (No model.)

*To all whom it may concern:*

Be it known that I, CASPER ZIMMERMAN, a citizen of the United States of America, residing at Sioux Falls, in the county of Minnehaha and State of South Dakota, have invented certain new and useful Improvements in Wagon-Tires, of which the following is a specification, reference being had therein to the accompanying drawings.

The special object of the invention is to make a supplemental tire for farm wagons, to be used over the ordinary tire when a vehicle is to be used on meadows, to prevent "poaching," or on other soft ground to lessen the draft on the team.

The invention consists in the particular construction of the tire to adapt it to be secured to the wheel and over the ordinary tire so that it may be readily attached or detached.

Figure 1 of the drawings is a side-elevation, of a wheel with my supplemental tire applied, Fig. 2 a vertical section thereof and Fig. 3 a detail perspective view of the tire.

In the drawings, A represents a wheel having the hub $a$, spokes $a'$ and felly $a^2$.

B is the ordinary tire which may be put on the felly and secured thereon in any preferred way.

C is my supplemental tire which is preferably made about four inches wide or twice as wide as the ordinary tire. On the inside of this tire and on each side of a median line thereof is formed a bead D, the two beads being annular, parallel rings with a space between them equal to an ordinary tire.

The tire C has its two ends $c\ c$ bent inwardly at right angles to the body of the tire and cut out in the middle so as to straddle the tire B and the felly $a^2$. These bent ends $c\ c$ are connected by the screws E and drawn tight by the nuts F.

When the farmer is drawing loads over meadows or soft ground or in snow, these tires will greatly lessen the draft of the load, save labor to the animals and enable him to haul much heavier loads. It will also prevent him from cutting up the dirt roads in wet weather and cause both wagon and horses to last much longer.

I am aware that it is not new to use supplementary tires whose ends are riveted to right angled metallic pieces drawn together by screws and provided with studs which fit on each side of the felly; also that the ends of a metallic roller have been bent at right angles and held together by screws but

What I claim as new, and desire to protect by Letters Patent, is—

A supplementary tire with continuous flanges fitting on each side of the felly around its whole circumference and with bifurcated ends also fitting on each side of the felly, said ends being drawn together by the screws to make them fit tightly about the felly as described.

In testimony whereof I affix my signature in presence of two witnesses.

CASPER ZIMMERMAN.

Witnesses:
J. J. ALLEN,
B W. ANDERSON.